Jan. 7, 1941.                D. F. OTHMER                2,227,979
                    TREATMENT OF PYROLIGNEOUS LIQUORS
                      Filed Oct. 30, 1936        3 Sheets-Sheet 1

Donald F. Othmer
INVENTOR.

BY

ATTORNEYS

Jan. 7, 1941.　　　D. F. OTHMER　　　2,227,979
TREATMENT OF PYROLIGNEOUS LIQUORS
Filed Oct. 30, 1936　　　3 Sheets—Sheet 2

Donald F. Othmer
INVENTOR.
BY
ATTORNEYS

Jan. 7, 1941.  D. F. OTHMER  2,227,979
TREATMENT OF PYROLIGNEOUS LIQUORS
Filed Oct. 30, 1936  3 Sheets-Sheet 3

Donald F. Othmer
INVENTOR.

BY
ATTORNEYS

Patented Jan. 7, 1941

2,227,979

UNITED STATES PATENT OFFICE 2,227,979

TREATMENT OF PYROLIGNEOUS LIQUORS

Donald F. Othmer, Brooklyn, N. Y., assignor to Eastman Kodak Company, Rochester, N. Y., a corporation of New Jersey Application October 30, 1936, Serial No. 108,438

15 Claims. (Cl. 260—541)

This invention relates to a process for the improvement of pyroligneous liquors and more particularly for the separation of tar in the processing of pyroligneous liquors for the production of acetic acid, or derivatives such as salts or esters, and methanol. My invention also is concerned with the tar residue obtained by such treatment, and with the acetic acid which may be concentrated subsequent to this treatment.

In the usual processes for distilling wood, pyroligneous liquors are evolved along with noncondensable gases during the dry distillation process which leaves charcoal as a residue in the retort or oven. These pyroligneous liquors contain tarry materials as such which settle out on standing to give the so called "green tar" or "settled tar" and also various materials which may become tars due to subsequent action such as polymerization or condensation among themselves. This tendency to form tars is a particularly troublesome problem and is met with in all subsequent operations concerning the treatment of pyroligneous liquors. It is known that at almost every step of such processes, tars are precipitated due to the polymerization or condensation of these materials.

Various methods have been proposed for the removal of such tars and tar forming materials in order to facilitate the separation and purification of the valuable materials in the pyroligneous liquor. One of the common methods which has been proposed is the use of mechanical tar separators in the vapor lines from the retorts. These tar separators, however, are useful principally in the elimination of green tar from the liquors since the chemical materials which may later form tars at subsequent steps in the process may not be removed mechanically.

Another method which has been proposed is the passage of pyroligneous liquor in the vapor phase through several contacting steps involving strong liquid sulfuric acid. An improvement on this process is that in which the strong sulfuric acid is used in a scrubbing arrangement for contacting these vapors. It should be noted that both of these as well as the common use of sulfuric acid for conversion of calcium acetate to acetic acid are concerned with the use of an amount of sulfuric acid of very high concentration with respect to the water present at the point of use and large in amount with respect to the acetic acid present.

A system which has been used in treating dilute solutions of acetic acid which are obtained in cellulose derivative manufacture involves the use of sulfuric acid to remove the cellulosic impurities in such dilute acid; which are, of course, of an entirely different chemical and physical nature from the impurities in pyroligneous acid.

I have found that the tar forming materials may be removed and that subsequent impurities in the final products may be eliminated by the treatment of these pyroligneous liquors with a small amount of a material such as sulfuric acid. It is to be noted that in my process, the quantity of sulfuric acid used is so small that it is neither a scrubbing or washing process but is probably more akin to catalysis. Such treatment seems to hasten polymerization, condensation, or whatever other chemical reaction is involved between these tar forming materials to such an extent that practically all of the materials are removed as tars once and for all at a single stage in the process; due largely to the comparative insolubility of the chemical bodies resulting from such treatment. The tars and oils so thrown down are hereinafter called "sulfuric tar." This designation does not, however, indicate that they necessarily contain any free or combined sulfuric acid or sulfur compounds.

One object of my invention is the purification of pyroligneous liquors by their treatment in the liquid phase. Another object is the polymerization and condensation of chemical materials which have the power to combine and form tars in pyroligneous liquors. Still another object is the prevention of fouling of heating and other surfaces of equipment processing pyroligneous liquors. A still further object is the simplification of processes in separating and purifying acetic acid from pyroligneous acid by the removal of tars and tar forming materials.

Another object is the produdtion of concentrated acetic acid. A further object is the production of refined acetic acid from wood distillation without the use of any oxidizing materials of the nature of sodium bichromate or potassium permanganate. A still further object is the production of a new type of matter hereinafter called "sulfuric tar" which is formed as the result of my novel process and the separation of these tar forming materials from the pyroligneous acid. Other objects will appear hereinafter.

It is a fact that by distillation of pyroligneous liquor after preliminary settling of the green tar, a large percentage of the tar remaining in solution in the liquor may be eliminated as a still pot residue. This second type of tar removed is called "boiled" tar and is somewhat different in chemical characteristics from the green tar as would be expected from its greater solubility in the liquor. The liquor which is obtained by such a distillation step may then be passed to a process for obtaining wood alcohol and then acetic acid either as such or as calcium acetate. An amount of tar or tar forming materials still remain in the liquor, however; and these materials give a brown or dark red muddy appearance to the liquor which darkens on standing. The resulting acetic acid or the resulting calcium acetate is contaminated with these materials. Also, it is common experience that the equipment used for these later operations (as well as for this "tar distillation" itself) becomes fouled or plugged due to the polymerization or condensation on the heating surfaces and other parts of the equipment.

It is thus seen that while some of the tar forming bodies are insoluble and separate in the green tar, and others, while soluble, are non-volatile and thus separate in the boiled tar, there still remains materials which are both soluble and volatile and are carried through to the subsequent steps. These tar forming bodies or impurities may pass on to either the wood alcohol or to the acetic acid which are subsequently obtained. Certain of the impurities may not necessarily form tars under ordinary circumstances but do give rise to color in the products. This color, while due to only a very minute amount of material, is very objectionable. One such material is diacetyl.

I have found that, by the addition of a small amount of sulfuric acid to the liquid being added to and evaporated by the primary still, these materials which volatilize along with the pyroligneous acid may be condensed, polymerized, or possibly catalytically converted, thereby removing this tar material and allowing it to be separated from the still pot with the "boiled" tar. The distillate so obtained is clear—contains no tar particles in suspension, is usually light yellow in color, and does not darken on standing. All or practically all of the color forming bodies such as diacetyl may be eliminated by this treatment with sulfuric acid. I have found that the tars, oils, or pitch which are condensed or polymerized by this action of sulfuric acid have different chemical and physical characteristics than those obtained in the usual treatment of pyroligneous liquors such as the "green" tar or the "boiled" tar mentioned above. For example, the volatility is tremendously decreased and there is no tendency to form a hard, resinous, coke-like material such as is present in the other types of tar. These and other properties distinguish tar, oils, or pitch obtained as a different material of different characteristics than has been obtained heretofore. These new "sulfuric" tars have a number of uses such as for solvents. Another use is for wood preserving and staining.

The still pot and accessories (heating tubes, catchalls, piping, pumps, etc.) are not only kept clean and free from the deposit customarily expected in both liquid and vapor spaces; but I have found that equipment badly crusted from former operation without sulfuric acid, cleaned itself due to the solvent action of the tars precipitated by the sulfuric acid.

I have also found that, by treatment of the dilute liquors in other processing steps where the primary or tar distillation is not utilized, the sulfuric acid will accomplish this same polymerization or condensation of tar forming materials and remove a large percentage of material commonly removed as boiled tar as well as the volatile tar-forming materials above mentioned. This is accomplished by allowing the sulfuric acid in a concentration of a few percent to react for a period of hours in a heated condition with the pyroligneous liquor; and the chemical action results in a precipitation of impurities as an oily tar layer—usually of a specific gravity from 1.05 to 1.15. This layer contains some acetic acid in solution and is separately processed.

While reference above has been made (and for convenience throughout this specification will be made) to sulfuric acid as an agent for polymerizing or condensing tars, I have found that other strong inorganic and organic acids such as hydrochloric, nitric, phosphoric, and oxalic, may be used. Results using the same amount of three of these acids on respective samples of the same liquor are shown in the table. In each case 5% by weight of acid indicated was added and the material was refluxed at the boiling point for three hours.

*Table*

| Acid | Total residue, percent of weight of liquor used | Pitch, percent of weight of liquor used |
| --- | --- | --- |
| Sulfuric (66° Bé.) | 1.3 | 0.4 |
| Phosphoric (82%) | .8 | 0 |
| Oxalic (crystals) | .5 | 0 |

No other acid appears to combine the requirements of efficiency, non-volatility, and minimum amount of corrosion as well as sulfuric, although under some conditions others may be used. While sulfuric acid is my preferred embodiment, I do not wish to be limited to the use of sulfuric. Various acid and neutral salts of sulfuric and other acids also have a greater or less efficiency in this regard, and in some cases their use may be more advantageous or economical than that of the acid itself.

Carrying out my process with various amounts of sulfuric acid up to a concentration of ten percent of the amount of pyroligneous acid, indicate that increasing amounts of sulfuric acid within that range precipitate an increasing amount of tar. While larger amounts of sulfuric acid may be used up to 20% or more, the additional cost of the acid is not usually warranted by the increased value obtained in the purification process when larger amounts than about 20% are used. The treatment should be conducted in a liquid state in such a way that the sulfuric acid present is always considerably less than the amount of pyroligneous acid present at the point of the treating operation. In the case of the vapor phase treatments previously mentioned, the amount of sulfuric acid present in the treating step is tremendously greater than the weight of the vapors present at that point. In general it may be said that the advantage of my process is obtained by the treatment with sulfuric acid in amount not more than 20% of the total material present at the point of the treating operation. Other experiments indicate that increasing the length of time of such contact of sulfuric acid and pyroligneous liquor increases the amount of tar materials removed.

Also, the effect of increased temperature was found to reduce the length of time required to accomplish a given reaction. Under atmospheric pressures, the maximum temperature available is the boiling point and this is taken advantage of in the primary still (or pre-evaporator). Increasing the boiling pressure increases the rate of the polymerization reaction, due to the increased temperature.

In any primary still of given capacity which is continuously fed at a known rate, the average time of liquid therein (and thus time in contact with any sulfuric acid with which it is charged) is fixed and calculable. To secure a desired amount of polymerization under these fixed conditions of temperature and time of contact, it is possible to vary the concentration of sulfuric acid present within rather wide limits.

It was found that the tar precipitated could be separated into two fractions: one a fluid tar, free flowing at all temperatures above room temperature, and a second fraction consisting of a pitch-like material which separated out when the tar was allowed to cool from the elevated temperature of the experiment to the room temperature. In some cases the separation of the so called "pitch" was very slow at room temperature; and it was assisted by giving the tar an alkaline wash using caustic, soda ash, or lime. In treatment of some pyroligneous liquors, no pitch separates—particularly if the liquor has been previously evaporated for "boiled tar."

The processing steps using sulfuric tar hereinafter described may be made either with the tar formed by the action of the sulfuric acid in a hot storage tank or with the tar from an evaporator or still to which sulfuric acid is added— this includes boiled tar. In either case, the tar may or may not be chilled or washed with a caustic solution to throw out pitch as is found to be the best practice under the individual conditions pertaining.

For a more complete understanding of my invention, reference may be had to the accompanying drawings which are primarily in the nature of graphs and flow sheets.

Figure 1:
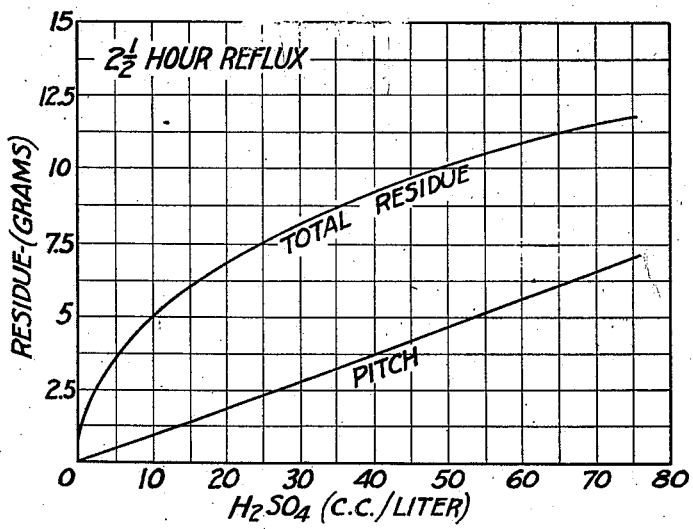
Fig. 1 represents curves showing the amount of tar obtained from a sample of demethanolized, pyroligneous liquor, after settling out the green tar by using different concentrations of sulfuric acid and maintaining the liquor at the boiling point for constant lengths of time.
Figure 2:
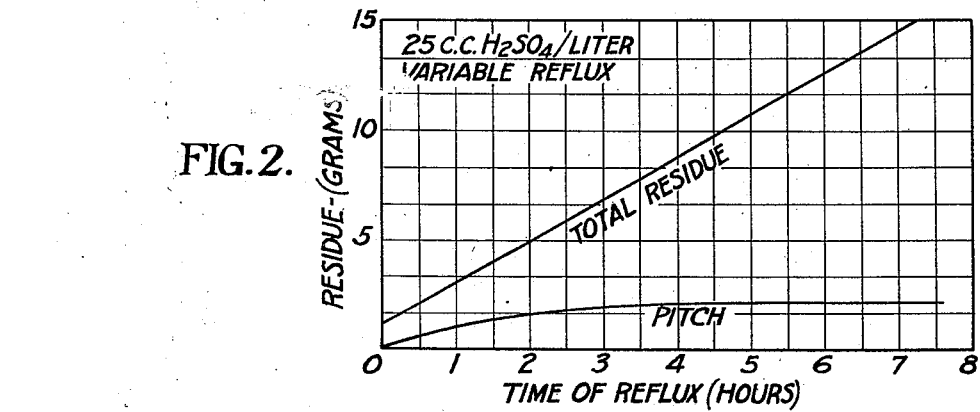
Fig. 2 represents curves illustrating the amount of tar obtained from the same liquor with various constant amounts of sulfuric acid and different times of contacting.
Figure 3:
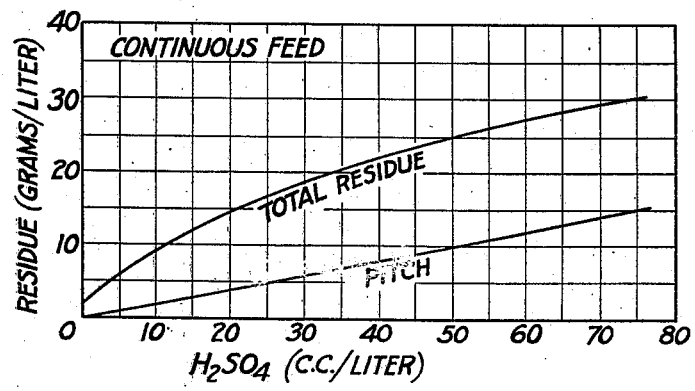
Fig. 3 represents curves showing the amounts of tar obtained (both sulfuric and boiled) with different concentrations of sulfuric acid when a continuous feed of pyroligneous liquor was distilled.
Figure 6:
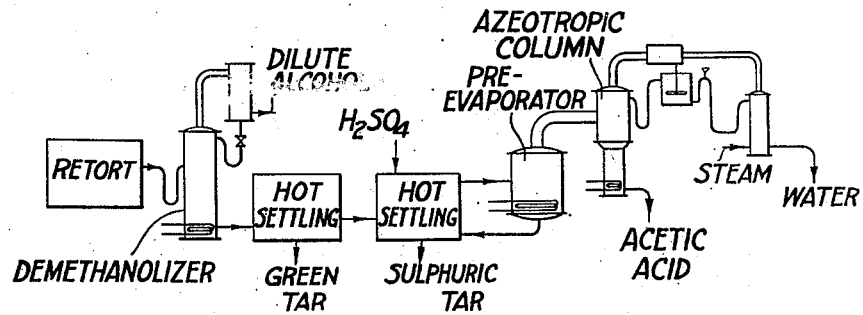
Fig. 6 represents a diagrammatic flow sheet illustrating the adaptation of this treatment with sulfuric acid to an azeotropic distillation system for the concentration of acetic acid.

The pyroligneous liquor which was treated to give the results shown in Figs. 1, 2, and 3 was obtained from the distillation of wood consisting principally of maple and was demethanolized and settled to have the green tar removed after the demethanolizing operation as diagrammed in Fig. 6. For comparison, the pyroligneous liquor used to give Fig. 4 was obtained from a different plant in which the wood is principally oak. In this case the soluble tar was removed with the boiled tar in a preliminary evaporation and the liquid subsequently demethanolized.

Inspection of Fig. 2 indicates that after heating at the boiling point for three hours 7 grams of total tar residue was obtained with the use of 25 cc. of 66° Baumé sulfuric acid per liter of pyroligneous liquor. From Fig. 3 it is seen that 15.8 grams of tar residue was obtained by the use of 25 cc. of 66° Baumé sulfuric acid per liter of pyroligneous liquor by distillation in a flask containing one liter of boiling liquid and with a continuous feed of one third liter per hour. This gave an average time of the liquor in the flask of three hours.

If these two amounts of tar residue are compared, it will be seen that 8.8 grams more was precipitated in this third experiment than the second. This indicates that the evaporation of the liquid away from the tar residue is a desirable part of the process under these circumstances. By further inspection of Fig. 3 it will be seen, however, that only 1.75 grams precipitated due to the evaporation when no sulfuric acid was present. This 1.75 grams is representative of the amount of boiled tar which would be obtained and it may be noted that it is small in comparison to the 8.8 grams.

Figure 4:
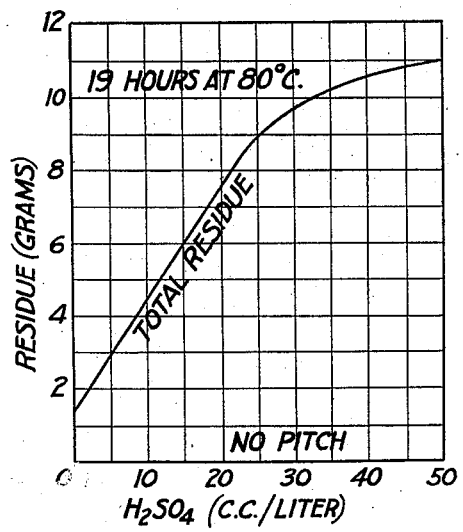
Fig. 4 represents a curve showing amounts of tar obtained with different concentrations of sulfuric acid when the liquor was allowed to stand at 80° C. for 19 hours. Since this liquor sample had been previously evaporated to remove "boiled" tar, no pitch was produced.

It is shown by inspection of Fig. 4 that in those cases where it is not desired to evaporate raw liquor before proceeding with the acid concentration (in a liquid-liquid extraction process, for example) tar may be eliminated by the action of the sulfuric acid in the liquid if it is maintained at a temperature around 80° C. In practice this merely means a large wooden storage tank for the hot liquid as its slow cooling due to heat loss over a period of 20-30 hours will not lower the temperature below the effective level. Experiments indicate that while standing even at room temperature 25 cc. of sulfuric acid per liter will precipitate as much as 2 grams per liter of tar in 24 hours.

Figure 5:
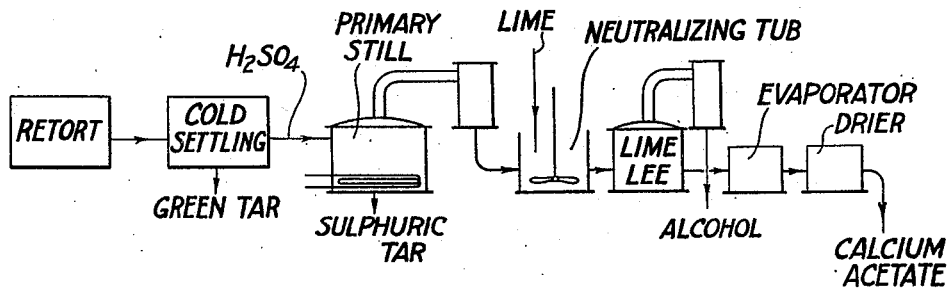
Fig. 5 represents a system for the use of this process of tar removal in conjunction with the production of calcium acetate, sodium acetate, or other salt of acetic acid.

It will be noted that the process of Fig. 5 is substantially the usual one of the wood distillation industry with the exception that a small amount of sulfuric acid is added to the liquid going to the primary still. This sulfuric acid causes the condensation and removal of sulfuric tar in the primary still along with the usual boiled tar and produces a cleaner grade of calcium acetate than would otherwise be made. Under some conditions, it is possible to entirely eliminate the primary still and substitute instead a hot storage tub to which is added the sulfuric acid, and from which is decanted the sulfuric tar.

This may be installed either before or after demethanolizing if this operation precedes neutralization.

In Fig. 6 the application of the process to an azeotropic dehydration of the pyroligneous liquor after demethanolizing is indicated and the process is modified from that illustrated in Chemical and Metallurgical Engineering, vol. 42, July 1935. In this case, the sulfuric acid is added to the storage tank preceding the pre-evaporator supplying vapor to the azeotropic column. A part of the tar forming materials still in solution are rendered insoluble by the action of the sulfuric acid; and the action in the pre-evaporator where the sulfuric has an additional time of contact with the liquid at the boiling temperature still further precipitates sulfuric tar as well as boiled tar due to the removal of the volatile materials, principally water and acetic acid. These tars are in contact with a somewhat stronger acetic acid solution in the pre-evaporator than the feed to the pre-evaporator, and in order to wash out a part of this acetic acid, the tars drawn off from the pre-evaporator may be discharged back to the hot storage feed tank. This allows the acid in the tar to be washed out to the point where the tar is in equilibrium with the acid in the dilute feed. If, for any reason, tars containing an amount of acetic acid in equilibrium with the acid concentration of the pre-evaporator are desired, they may be withdrawn directly from the pre-evaporator. The concentration and removal of water from the acetic acid by azeotropic distillation has been described in Chem. & Met. and elsewhere, except that the refining process is made more easy due to the removal of tarry and colored impurities. Various methods of conducting the azeotropic distillation step for the purification of pyroligneous are familiar to those in the art and the modification of this process to suit such methods will be readily apparent from my disclosure herein. For example, it is possible to displace the pre-evaporation step by a settling of tar materials due to the action of sulfuric acid before passage to the azeotropic unit. In this case a liquid feed to the azeotropic column would be used. In my co-pending application 54,120 now Patent No. 2,186,617 there is described an azeotropic system in which the methanol is removed in the column which separates traces of the azeotropic solvent from the water run-off. I have found that the sulfuric treatment is equally advantageous when used in the presence of the methyl alcohol as it would be in this case. Other examples of azeotropic processing may also use sulfuric acid for removing tar forming materials.

Figure 7:
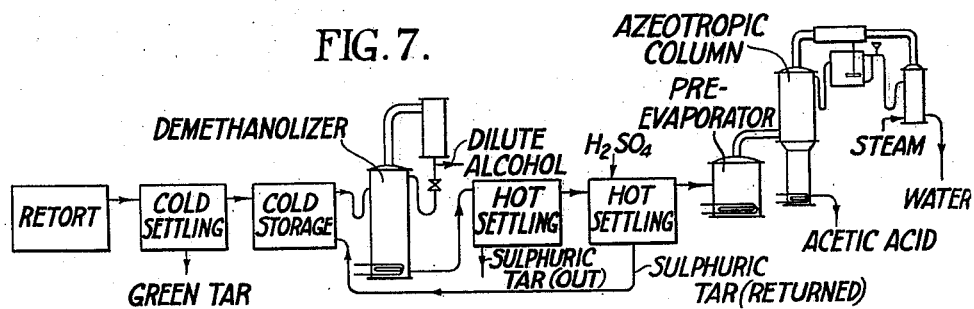
Fig. 7 illustrates alternate flow sheet using the azeotropic process.

In Fig. 7, a somewhat different processing step is followed in regard to the sulfuric tar. In the usual case, it is desirable to allow a certain amount of tar and tar oil materials to be present in the liquid fed to the demethanolizer. This tar oil keeps the demethanolizer from fouling by the condensation of pitch-like materials. For some purposes, however, the green tar is spoiled due to the heating action of the demethanolizer column; and it is desirable to remove this green tar prior to the removal of alcohol. I have found that sulfuric tar is an excellent material for cleaning and keeping clean the demethanolizer column; and therefore Fig. 7 shows the removal of sulfuric tar from the hot storage tub feeding the azeotropic system and its discharge to the storage tub feeding the demethanolizer. This tar, after accomplishing its function of keeping the demethanolizer clean, is then removed in an additional tar settler.

Figure 8:
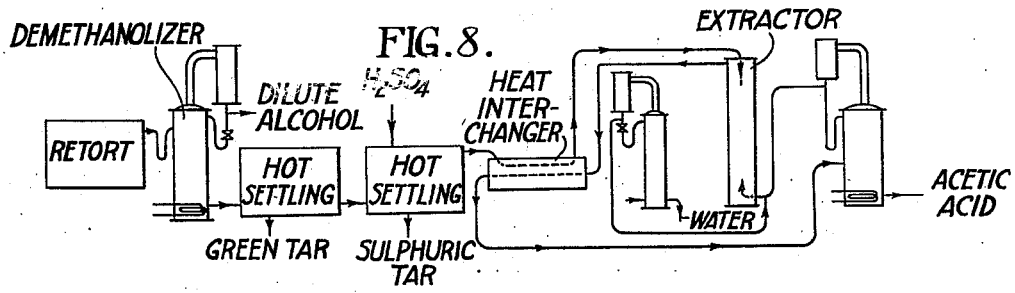
Fig. 8 represents the use of this purification method in conjunction with an extraction process for recovery of acetic acid, using a low boiling solvent.

In Fig. 8 there is exemplified one method of taking advantage of the use of sulfuric acid for tar removal in a process for the direct production of acetic acid by liquid-liquid extraction with a low boiling solvent such as ethyl acetate, ether, or other materials familiar to the art. The demethanolizing and hot tar settling is accomplished as before; and the sulfuric acid is added to the liquor and allowed to act in the heated state for a period of time sufficient to take advantage of its condensing and polymerizing action. The liquor then passes through a heated interchanger to cool to the desired temperature for extraction; and is then passed to a counter current liquid extractor as in the usual practice. The solvent containing the acetic acid is passed to a distilling column which separates the concentrated acid at the bottom and the solvent for reuse at the top. The spent watery layer, containing some solvent dissolved therein is passed to a stripper or exhausting column which discharges water to waste at the bottom and solvent at the top. The solvent from the top is then reintroduced into the main body of solvent for reuse.

The use of sulfuric acid in this process removes tars to such an extent that the standard operation of evaporating this dilute liquor for tar removal may be eliminated, with consequent saving of equipment and steam.

Figure 9:
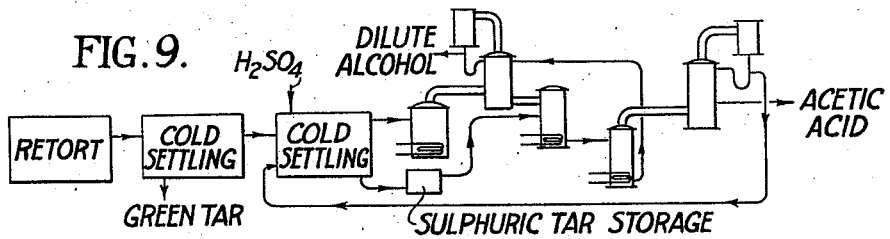
Fig. 9 represents the use of this process in a system utilizing a high boiling solvent extracting the pyroligneous liquor in the vapor phase.

In Fig. 9 is shown the use of sulfuric acid in conjunction with the so called Suida process described in Industrial and Engineering Chemistry, vol. 24, p. 722-1932, and elsewhere. I have found that sulfuric tar has an excellent extraction coefficient for acetic acid in the vaporous condition; and part or all of the tar formed in treatment of the liquor may be used for vapor phase extraction according to this process. Because of the use of sulfuric acid and the consequent polymerization or condensation of tar forming and colored materials, I have found that a better grade of acetic acid is produced in this operation than by the use of other materials. Fig. 9 shows the use of sulfuric tar as an extractant; but other extractants may be used as at present. In that case, the sulfuric tar may, of course, be eliminated and advantage taken merely of the purifying action of sulfuric acid and not of extracting power of sulfuric tar.

Figure 10:
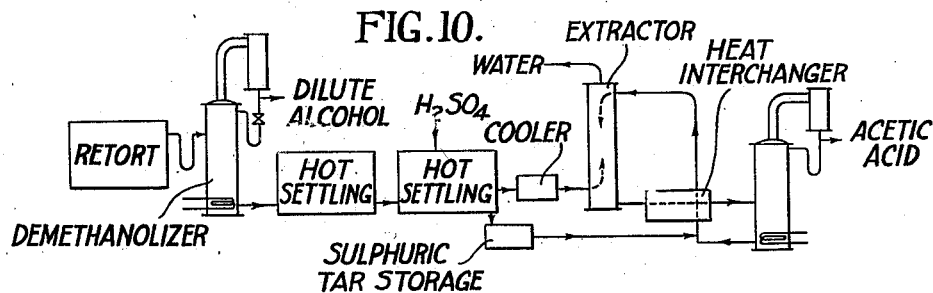
Fig. 10 represents the application of this method of tar separation in a process using a high boiling solvent in a liquid-liquid extraction.

In Fig. 10 is shown a process whereby the extraction efficiency of sulfuric tar is taken advantage of in a liquid-liquid extraction system. The operation is substantially similar to that described in my copending application No. 755,361 now Patent No. 2,157,143 for the use of high boiling materials in extracting acetic acid; and a pure grade of acid results due to the use of sulfuric acid for removing tar forming materials, a part or all of which are then used for extraction. The extraction may be conducted on hot liquid; and the cooler for feed to the extractor may be eliminated if desired. No solvent materials are required other than those in the liquid being handled. An additional advantage is that, because of the low solubility of the sulfuric tar in water, and its low value, it is not necessary to strip or exhaust this water of solvent before passing it to waste. The attendant steam saving is considerable. By elimination of the sulfuric tar after its first precipitation, it is possible to use other high boiling solvents for extracting the purified liquor. In this case, as in the use of sulfuric tar for vapor phase extraction in Fig. 9, the sulfuric tar may be cooled or washed with water or an alkali and decanted, or distilled to remove the pitch which has relatively little value as an extractant, increases the apparent viscosity, and slowly hardens in use. It is also apparent that the sulfuric tar may be used in the flow sheets of Figs. 9 or 10 in those cases where other dilute acids besides pyroligneous are to be concentrated.

Figure 11:
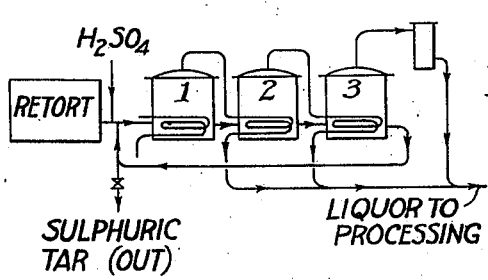
Fig. 11 represents the flow sheet when a multiple effect evaporator or primary still is used in conjunction with the sulfuric acid treatment to purify liquor for subsequent processing.

In some cases it may be desired to evaporate the liquor, before subsequent treatment for methanol and acetic acid separation, in a multiple effect evaporator rather than in the simple primary still shown in Fig. 5. In Fig. 11 is indicated this operation, with a triple effect evaporator, and those familiar with multiple effect units of this type know that a part of the liquor will be evaporated in each effect. With the customary feeding method, all of the liquor would be introduced into the first effect, the remainder after evaporation into the second, and the remainder at that point into the third. Such a system washes all of the sulfuric acid into the final effect where it will remain in contact with only a fraction of the boiling liquor. The desired contact with all of the material may be maintained by continuous circulation of a small amount of the liquor from the final effect back to the first to prevent the concentration of sulfuric acid building up in the last effect at the expense of the others. Obviously this operation would be equally effective if the evaporator removed both insoluble and soluble tars—or if the insoluble tar was removed in a preliminary green tar settling tub.

These flow sheets are to be regarded merely as exemplary of the variations in which this method of treatment with sulfuric acid may be conducted to improve existing processes. Many other combinations and flow arrangements suggest themselves to those skilled in the art, and are limited only by the subsequent claims. For example, I have found that under some circumstances it is desirable to add the sulfuric acid to liquid going into the first cold tar settling and thus remove sulfuric tar with the settled tar. In Fig. 5 this may be done by mere addition of sulfuric acid before rather than after the first settling tub. Or in Fig. 8, the sulfuric acid may be introduced into the feed going to the demethanolizer or the tar settling tub with sulfuric addition placed before the demethanolizer.

Under some circumstances, it may be desirable to add the sulfuric acid before the liquor passes through the demethanolizer and for example in Figs. 6, 7, 8 and 10 if this was done, green tar and sulfuric tar could be thrown down and removed together. I have found that this may aid the removal of wood oils in the customary draw-offs mid-way up the demethanolizing column, and thus aid in the obtaining of alcohol free of oils.

While reference is particularly made to sulfuric acid as this is my preferred embodiment, it is to be understood that my invention has wider applications and may include salt, ester, or other derivative of the acid which is produced in the subsequent processing.

From the foregoing it is apparent that my invention is susceptible of many modifications and possesses numerous advantages. It is to be noted that I have also found that in practice only a very small quantity of sulfuric acid is required in this use—for example, all of the benefits have been obtained in an azeotropic unit operating in accordance with either flow sheet Fig. 6 or 7 and producing 6000 pounds of acetic acid per day from an approximately 8% feed, by the daily addition of 12-15 pounds of sulfuric acid to the hot storage tub indicated. While the concentration of sulfuric acid may be several per cent in the pre-evaporator, such a small addition of acid suffices because there are only very minor losses due principally to: (1) chemical utilization, (2) mechanical or dissolved loss in tars, (3) entrainment in vapors to azeotropic column. Because of the insignificant amounts of sulfuric acid used, it is evident that the chemical action is probably only catalyzed by the sulfuric acid; and the total operating cost is merely that of the sulfuric acid, which is negligible.

I claim:

1. In a process of treatment of pyroligneous liquors the step of adding less than ten percent of sulfuric acid in order to precipitate tar, oils, and pitch.

2. A process for treating pyroligneous liquors which comprises contacting from one tenth to not greater than five percent of sulfuric acid with said liquors for 1 to 20 hours.

3. In a process for separating acetic acid from settled pyroligneous liquor, the step which comprises adding a less than 5% of sulfuric acid to said liquor to cause the polymerization, condensation, or decomposition of materials which would otherwise discolor the separated acetic acid.

4. In a process for the production of acetate of lime from pyroligneous liquors, the step which comprises incorporating sulfuric acid in an amount less than 20% in the primary still to cause the polymerization or condensation of tar-forming materials, said step being carried out in the liquid phase with heating.

5. A method for the production of acetate of lime from pyroligneous liquors which comprises removing green tar by settling, then contacting the settled liquors with sulfuric acid in a quantity not greater than 10%, to remove tar-forming materials, and converting the improved tar-free liquors to acetate of lime.

6. The process for the production of dehydrated acetic acid from demethanolized pyroligneous liquor which comprises supplying demethanolized pyroligneous liquor to a pre-evaporator, treating this pyroligneous liquor with an amount of sulfuric acid less than 10% of the liquor treated for causing the removal of tar forming matter, vaporizing the improved pyroligneous liquor and subjecting the vapors to treatment for obtaining dehydrated acetic acid therefrom.

7. The process for treating pyroligneous liquor which comprises distilling methanol-containing pyroligneous liquor in a column in the presence of sulfuric tars whereby fouling of the column is prevented.

8. In a process for azeotropic removal of water from dealcoholized pyroligneous liquor to produce dehydrated acetic acid, the steps which comprise the separation of tar forming impurities from said liquors by the use of sulfuric acid in the pre-evaporator supplying vapor feed for the azeotropic distillation.

9. In the process for the separation of acetic acid from demethanolized pyroligneous liquors by extraction with a solvent for the acetic acid, the step which comprises the removal of tar-forming materials prior to the extraction operation by the treatment of said liquors with sulfuric acid in a quantity not greater than 10%.

10. In a process for the separation of tarry residues by the action of a small amount of sulfuric acid less than 15% of the liquid being evaporated in a multiple effect evaporator, for the elimination of these and other non-volatile materials, the steps which comprise feeding said pyroligneous liquor into the first of one of said effects, passing pyroligneous vapors therefrom in heat transfer relation with a later effect, passing non-volatile liquor from a first effect into a later effect, and withdrawing non-volatile liquor from said later effects for feed to one of said first effects.

11. The process for producing dehydrated acetic acid from pyroligneous liquor which comprises subjecting pyroligneous liquor to an improvement treatment which includes contacting the pyroligneous liquor with less than 20% of sulfuric acid whereby tar forming materials are removed, and then subjecting the improved pyroligneous liquor to azeotropic distillation.

12. A process for the extraction of acetic acid from aqueous solutions thereof, which comprises extracting said solutions with an extracting agent essentially comprised of sulphuric tar which will extract said acetic acid, said tar being formed by the action of a small amount of sulphuric acid on the tar-forming materials present in settled pyroligneous liquor.

13. A composition of matter useful as a solvent for acetic acid, wood preserving and staining, comprising as an essential ingredient, a tarry polymerization product of decreased volatility having little tendency to form hard resinous coke-like products and otherwise having the properties of sulphuric tar obtained by treating settled pyroligneous liquor with less than 10% of sulphuric acid.

14. An extracting agent for use in concentrating dilute aliphatic acid solutions comprising as an essential ingredient a tarry polymerization product of decreased volatility having little tendency to form hard, resinous coke-like products and otherwise having properties of sulfuric tar, obtained by treating settled pyroligneous liquor with less than 10% of an acid from the group consisting of sulfuric acid, phosphoric acid and oxalic acid.

15. In a process for separating wood alcohol, acetic acid and tar from pyroligneous liquor, the steps which comprise settling the pyroligneous liquor to remove visible tarry materials, adding an amount less than 10% of at least one of the acids from the group consisting of sulfuric acid, phosphoric acid and oxalic acid to the settled pyroligneous liquor for assisting in causing the removal of invisible tar-forming materials which would otherwise be carried over as impurities in the wood alcohol, acetic acid and other products separated.

DONALD F. OTHMER.